US012621367B2

(12) United States Patent
Le et al.

(10) Patent No.: US 12,621,367 B2
(45) Date of Patent: May 5, 2026

(54) METHOD OF SESSION PERSISTENCE TECHNIQUES IN MICROSERVICES SYSTEM ON CLOUD ENVIRONMENT

(71) Applicant: VIETTEL GROUP, Ha Noi City (VN)

(72) Inventors: Chi Phat Le, Thanh Hoa City (VN);
Tien Dong Nguyen, Ha Noi City (VN);
Duc Binh Tran, Ha Noi City (VN);
Quoc Hung To, Ha Noi City (VN);
Phuong Nam Nguyen, Hai Phong City (VN); Anh Tuan Nguyen, Ha Noi City (VN)

(73) Assignee: VIETTEL GROUP, Ha Noi City (VN)

( * ) Notice: Subject to any disclaimer, the term of this patent is extended or adjusted under 35 U.S.C. 154(b) by 71 days.

(21) Appl. No.: 18/924,140

(22) Filed: Oct. 23, 2024

(65) Prior Publication Data

US 2025/0159053 A1     May 15, 2025

(30) Foreign Application Priority Data

Nov. 15, 2023    (VN) ............................... 1-2023-08075

(51) Int. Cl.
*H04L 67/141*        (2022.01)
*H04L 67/562*        (2022.01)

(52) U.S. Cl.
CPC .......... *H04L 67/141* (2013.01); *H04L 67/562* (2022.05)

(58) Field of Classification Search
CPC ............................ H04L 67/141; H04L 67/562
See application file for complete search history.

(56) References Cited

U.S. PATENT DOCUMENTS

2006/0277596 A1* 12/2006 Calvert ............... H04L 63/0218
                                                        726/3
2018/0063258 A1*  3/2018 Wang .................... H04L 65/613
2020/0228635 A1*  7/2020 Liu ........................ H04L 69/161

* cited by examiner

*Primary Examiner* — Chris Parry
*Assistant Examiner* — Steven C Nguyen
(74) *Attorney, Agent, or Firm* — patenttm.us

(57) ABSTRACT

The session persistence method in the microservice system in the cloud environment provides a session persistence mechanism with a specific "instance" by session identifier. The method ensures the continuity of requests with the same identifier. In addition, the method brings the benefit of resource optimization when only one resource management "instance" is required for each session. The method includes the following steps: building a session management service model; allocating and storing session identifiers; monitoring, tracking, and updating session identifiers.

1 Claim, 4 Drawing Sheets

METHOD OF SESSION PERSISTENCE TECHNIQUES IN MICROSERVICES SYSTEM ON CLOUD ENVIRONMENT

TECHNICAL FIELD COVERED

The invention relates to session persistence techniques in microservices system on cloud environment. Specifically, the proposed method helps optimize performance, peer-to-peer load balance, ensure that clients will continue to access the same microservice during interactions, optimize resources, and ensure the stability of the microservices system.

BACKGROUND OF THE INVENTION

Each Network Function in the 5G core network architecture is divided into smaller services, called microservices, which helps to divide the core network structure into specialized parts. These microservices interact and work together to ensure that requests from service subscribers are processed according to 3GPP standards. The use of microservices increases the flexibility and scalability of the system, allowing for more efficient management and operation in the 5G core network environment.

With the microservices model, each service is deployed as one or more instances. This allows for high availability and scalability of the system. However, having multiple instances also creates some limitations. One of the main problems is the loss of session state when a user's session is switched between services. State information and session data can be lost, making it difficult to maintain session state and continuous interaction. Furthermore, multiple instances can lead to inefficient resource consumption, as each request may be routed to a different service. This causes uneven loading and suboptimal use of system resources.

According to 3GPP standard, Session Management Functions (SMF) is an important function in mobile network, responsible for managing and controlling communication sessions between users and applications or services in the system. SMF ensures consistency and performance in the process of creating, maintaining and terminating communication sessions.

One of the main issues faced by SMF is session management as users move or interact with different networks and services within the mobile network. As the terminal moves across different network coverage areas, SMF must ensure that the communication session remains continuous and uninterrupted. This requires SMF to track and update information about the user's location, forward sessions appropriately, and synchronize information between relevant network elements.

With the microservice model, the SMF module will be deployed into multiple smaller instances, the issue of maintaining connections must be more concerned. It is necessary to ensure that the endpoint will continue to access the same resources throughout the interaction. This helps to avoid losing session state information, minimize the time and resources to establish and transfer new sessions, and improve performance and user experience.

During product development, the invention proposes a method for selecting a certain instance based on the session identifier. The use of the session maintenance method improves performance and ensures scalability during product operation and deployment.

BRIEF SUMMARY OF THE INVENTION

The purpose of the method is to maintain consistency and continuity in the processing of user sessions, while optimizing performance and resources in the microservice system. To achieve this purpose, the method needs to achieve the conditions for managing session-identified data. The method of the present invention includes the following steps:

Step 1: Build a session management model. The module will be divided into proxy instance and logic instance. The logic instance will handle the session logic, along with allocating the session identifier and providing that identifier to the proxy instance. The proxy instance is responsible for storing and managing the session identifier, thereby routing subsequent requests to the correct logic instance that is handling the session.

Step 2: Assign session identifier. The logic instance creates a new session identifier based on the subscriber's identifier, and then passes that session identifier to the proxy instance. The proxy instance stores the session identifier in a table associated with the logic instance that is handling the corresponding session.

Step 3: Perform session identifier monitoring and updating. The proxy instance will check whether the session identifier is still valid. If not, the proxy instance will perform session identifier deletion.

DETAILED DESCRIPTION OF THE INVENTION

Figure 1:
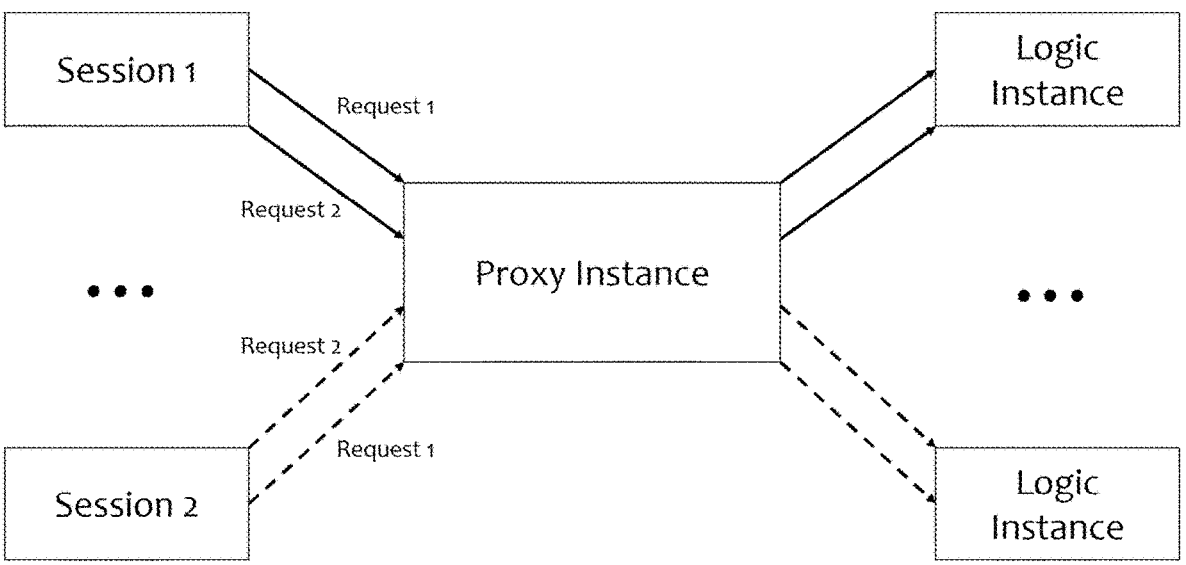
FIG. 1 is a diagram depicting the session management model.

The content and the drawings below describe in detail the method of maintaining working sessions in microservice systems on cloud routing environments, specifically as follows:

Step 1: Build a Session Management Model;

Referring to FIG. 1, the service will be designed according to the model of one proxy instance and many logic instances. In which, the logic instance is where the main task of the service is performed, and the proxy instance will route messages. A user session includes many request messages. When a request is sent to the service for processing, the proxy instance allocates the request to one of the logic instances. Here, the request will be processed by the logic instances and the result will be returned to the user.

In the above design, the proxy instance is responsible for selecting the logic instance according to the session identifier table. If there exists a function instance corresponding to the session identifier of the session request, the proxy instance will select that logic instance. If there is none, the proxy instance will select one of the logic instances according to a random rule. The proxy instance will forward the request to the selected logic instance.

The session identifier table contains information including:

Session identifier;

Information representing the function that generated the session identifier;

Time to monitor the validity of the identifier.

The Proxy instance initializes the session identifier table as shown in the table below.

| Identification | Logic instances | Time |
|---|---|---|
| Session identifier 1 | Logic instance 1 | 2023-06-01 09:10:00 + 07 UTC |
| . . . | . . . | . . . |
| Session identifier n | Logic instance n | 2023-06-01 09:10:00 + 07 UTC |

Figure 2:
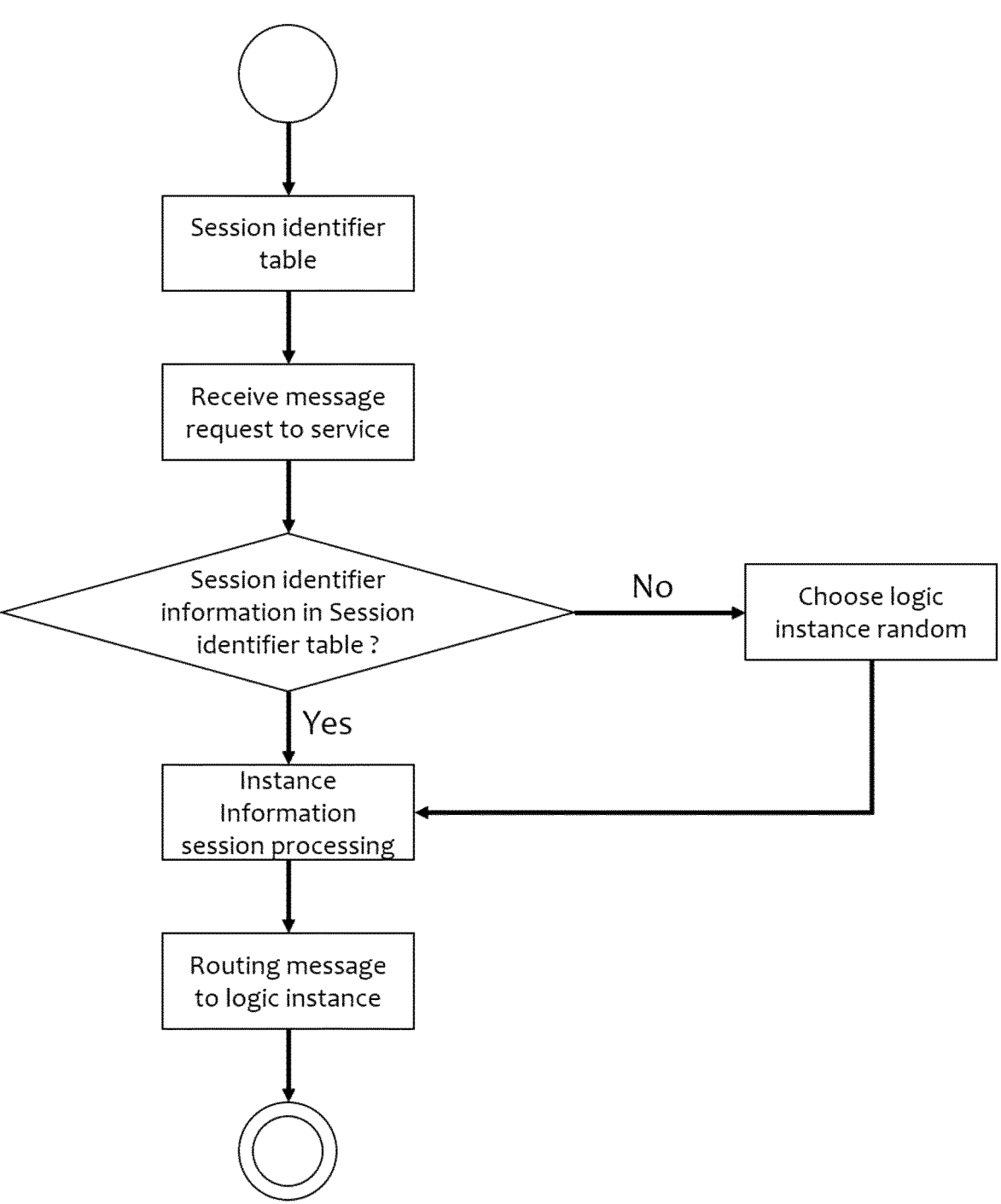
FIG. 2 is a selective diagram showing the functionality according to the session identifier.

Step 2: Assign Session Identifier;

Referring to FIG. 2, when a request comes to the service, the proxy instance will get the session identifier information from the request, then check whether the identifier already exists in the table. There are two cases that can happen:

First case: if it does not exist, the proxy instance will forward the request to a specific logic instance. The logic instance will initialize the session identifier and provide it back to the proxy instance. The proxy instance will store the identifier information along with the information of the logic instance that created the session identifier.

Session Identifier Construction Rules:

$$\text{Session identifier} = \langle \text{subscriber identifier} \rangle - \langle \text{index} \rangle$$

The session identifier is composed of the subscriber identifier together with the session sequence number. The sequence number is incremented for each session. This way of constructing the session identifier ensures that each session has only one session identifier. This allows for consistent session management.

Figure 3:
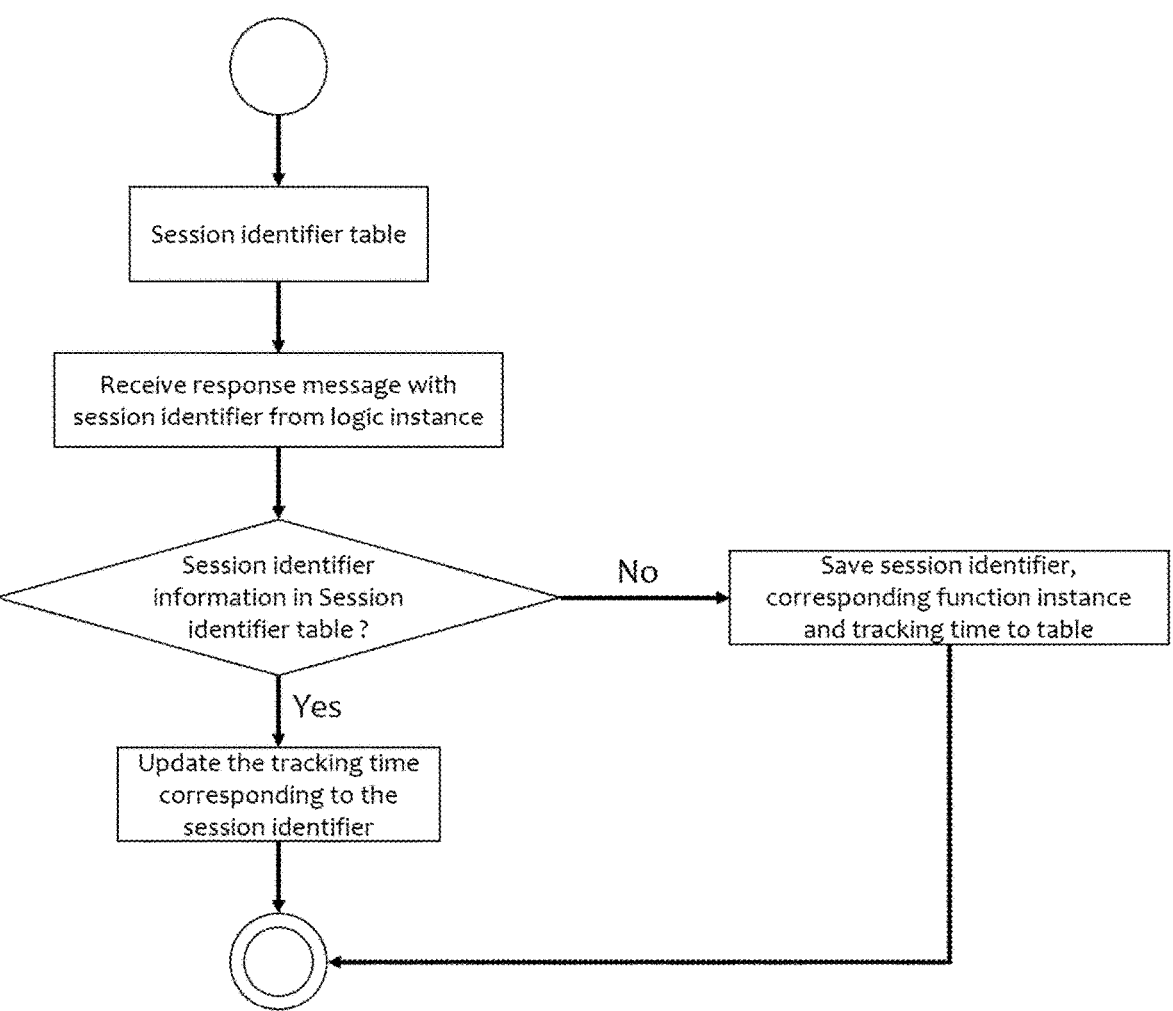
FIG. 3 is a diagram depicting the session identifier storage.

After receiving the session identifier from the logic instance, the proxy instance stores in its table the following information (refer to FIG. 3):

Session identifier;

The logic instance information that generated the session identifier;

The time to track the validity of the identifier.

Second case: if exists, the proxy instance will retrieve the information of the logic instance corresponding to the session identifier. From there, the proxy instance forwards the request to that logic instance. Update the session identifier tracking time in the identifier management table.

Figure 4:
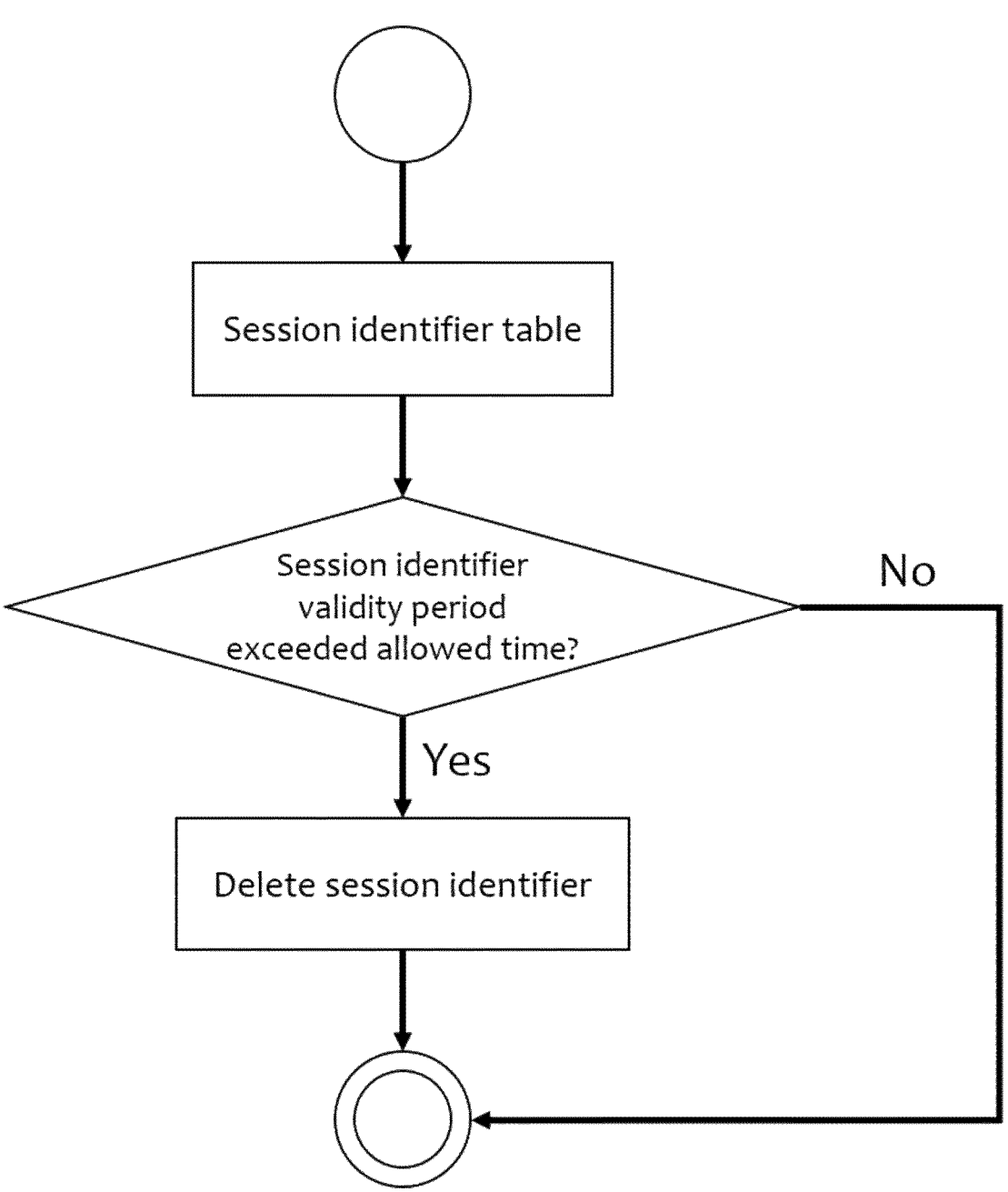
FIG. 4 is a diagram depicting the session identifier monitoring.

Step 3: Perform Session Identifier Monitoring and Updating;

Referring to FIG. 4, the identification information will be proxy instance reauthorize after a certain period of time. If the identification information is no longer valid within the period of time, the information will be deleted.

After the above three steps of session identifier management, the session management module can route requests of the same session to the same specific instance. The module can maintain the continuity of user session processing, and optimize the performance and resources in the microservice system. Thereby, the method has achieved the proposed purpose.

Example of Implementation of the Invention

This method is applied in subsystems that need to manage subscribers in the 5G core network system developed by Viettel High Technology Industries Corporation itself, specifically the SMF module of the 5G core network.

The Effectiveness of the Invention

The method of maintaining session persistence in microservice systems in cloud environments achieves the following benefits:

Guaranteed connection persistence: Maintaining session identifiers ensures that requests from the same subscriber will always be routed to the same one. This helps maintain a continuous and stable connection between services, which is especially important for control flow in 5G systems.

Resource optimization: By associating a session with a specific service instance, the resources serving the session only need to be managed by that instance. This means that there is no need to build a synchronization mechanism between instances.

The invention claimed is:

1. A method for session management in a microservices system operating in a cloud environment, the method including the steps of:

step 1: build a session management model;

designate a service according to a model of one proxy instance and a plurality of logic instances; wherein, the plurality of logic instances are where a main task of the service is performed, and the proxy instance will route messages; a user session includes many request messages; when a request is sent to the service for processing, the proxy instance allocates the request to one of the plurality of logic instances, the request will be processed by the plurality of logic instances and a result will be returned to a user;

wherein, the proxy instance is responsible for selecting one of the plurality of logic instances according to a session identifier table; if there exists a function corresponding to a session identifier of a session request, the proxy instance will select one of the plurality of logic instances; if there is none, the proxy instance will select one of one of the plurality of logic instances according to a random rule; the proxy instance will forward the request to the selected one of the plurality of logic instances;

the session identifier table comprises:

the session identifier;

function information representing the function that generated the session identifier; and time to monitor validity of the session identifier;

the proxy instance initializes the session identifier table as shown in the session identifier table below:

| identification | logic instances | time |
|---|---|---|
| session identifier 1 | logic instance 1 | 2023-06-01 09:10:00 + 07 UTC |
| . . . | . . . | . . . |
| session identifier n | logic instance n | 2023-06-01 09:10:00 + 07 UTC | step 2: assign the session identifier;

when the request comes to the service, get, via the proxy instance, session identifier information from the request, and check whether the session identifier already exists in the session identifier table; there are two cases that can happen:

first case: if it does not exist, the proxy instance will forward the request to a specific logic instance; the logic instance will initialize the session identifier and provide it back to the proxy instance; the proxy instance will store the session identifier information along with information of the logic instance that created the session identifier;

the session identifier construction rules:

$$\text{session identifier} = \langle\text{subscriber identifier}\rangle - \langle\text{index}\rangle$$

the session identifier is composed of a subscriber identifier together with a session sequence number; the session sequence number is incremented for each session;

after receiving the session identifier from the logic instance, the proxy instance stores in its table the following information:

the session identifier;

logic instance information that generated the session identifier;

time to track validity of the session identifier;

second case: if exists, the proxy instance will retrieve the information of the logic instance corresponding to the session identifier; forward, via the proxy instance, the request to the logic instance; and update the session identifier tracking time in the session identifier table;

step 3: perform the session identifier monitoring and updating;

the session identifier will be used by the proxy instance to reauthorize after a certain period of time; if the session identifier is no longer valid within the period of time, the session identifier will be deleted;

after the above three steps of session identifier management, the session management model routes requests of the user session to the specific logic instance; the session management model maintains the continuity of user session processing, and optimizes the performance and resources in the microservice system.

\* \* \* \* \*